(12) United States Patent
Helgeson et al.

(10) Patent No.: US 12,471,986 B2
(45) Date of Patent: Nov. 18, 2025

(54) CATHETER INCLUDING DEFLECTABLE SHAFT AND METHODS OF ASSEMBLING SAME

(71) Applicant: St. Jude Medical, Cardiology Division, Inc., St. Paul, MN (US)

(72) Inventors: Zachary L. Helgeson, Hennepin, MN (US); Xuan Khieu, Hennepin, MN (US)

(73) Assignee: St. Jude Medical, Cardiology Division, Inc., St. Paul, MN (US)

( * ) Notice: Subject to any disclaimer, the term of this patent is extended or adjusted under 35 U.S.C. 154(b) by 1109 days.

(21) Appl. No.: 17/065,190

(22) Filed: Oct. 7, 2020

(65) Prior Publication Data
US 2021/0128230 A1  May 6, 2021

Related U.S. Application Data

(60) Provisional application No. 62/928,436, filed on Oct. 31, 2019.

(51) Int. Cl.
*A61B 18/14* (2006.01)
*A61B 18/00* (2006.01)
*A61M 25/01* (2006.01)

(52) U.S. Cl.
CPC .............. *A61B 18/1492* (2013.01); *A61B 2018/00577* (2013.01); *A61B 2018/1407* (2013.01);
(Continued)

(58) Field of Classification Search
CPC ...... A61M 2025/0161; A61M 25/0144; A61B 18/1492; A61B 2018/1407; A61B 2018/1435; A61B 2018/144
See application file for complete search history.

(56) References Cited

U.S. PATENT DOCUMENTS 10,646,692 B2   5/2020  Tegg et al.
2002/0193790 A1  12/2002  Fleischman et al.
(Continued)

FOREIGN PATENT DOCUMENTS

WO   2012061164 A   5/2012

OTHER PUBLICATIONS

Communication pursuant to Article 94(3) EPC for European Patent Application No. 20 800 390.5-1113, mailed Dec. 22, 2022, 5 pages.
(Continued)

*Primary Examiner* — Sean W Collins
(74) *Attorney, Agent, or Firm* — Wiley Rein LLP

(57) ABSTRACT

A catheter shaft includes an elongate body extending from a proximal end to a distal end and including a proximal portion and a deflectable distal portion. The distal portion is selectively deflectable in at least one direction by actuation of a shaft actuator assembly. The elongate body defines at least one lumen extending from the proximal end to the distal end. The catheter shaft also includes a loop actuation wire extending through the at least one lumen and being operable to selectively adjust a diameter of an electrode loop assembly coupled at the distal end of the elongate body. The catheter shaft further includes a first coil wound around the loop actuation wire along the proximal portion of the elongate body and a second coil wound around the loop actuation wire along the distal portion of the elongate body. The second coil has a more flexible construction than the first coil.

20 Claims, 11 Drawing Sheets

(52) U.S. Cl.
CPC . *A61B 2018/1435* (2013.01); *A61B 2018/144* (2013.01); *A61M 2025/0161* (2013.01)

(56) References Cited

U.S. PATENT DOCUMENTS

| | | | |
|---|---|---|---|
| 2006/0241366 A1* | 10/2006 | Falwell | A61B 5/6856 606/41 |
| 2007/0270679 A1 | 11/2007 | Nguyen et al. | |
| 2012/0123326 A1* | 5/2012 | Christian | A61M 25/0158 604/95.01 |
| 2012/0265094 A1 | 10/2012 | Goldfarb et al. | |
| 2017/0291008 A1 | 10/2017 | Hillukka et al. | |
| 2018/0221626 A1* | 8/2018 | Tegg | A61M 25/0136 |

OTHER PUBLICATIONS

Communication pursuant to Notification of Reasons for Rejection for Japanese Patent Application No. 2022-515593, mailed May 16, 2023, 6 pages.

International Search Report and Written Opinion for International Patent Application No. PCT/US2020/054592, mailed Jan. 12, 2021, 13 pages.

* cited by examiner

CATHETER INCLUDING DEFLECTABLE SHAFT AND METHODS OF ASSEMBLING SAME

CROSS-REFERENCE TO RELATED APPLICATIONS

This application claims priority to U.S. Provisional Patent Application Ser. No. 62/928,436 filed Oct. 31, 2019, the disclosure of which is hereby incorporated by reference in its entirety.

BACKGROUND OF THE DISCLOSURE a. Field of the Disclosure

The present disclosure relates generally to medical devices that are used in the human body. More particularly, the present disclosure relates to catheters including a deflectable shaft, and methods of assembling such catheters.

b. Background

Medical devices, such as, for example, mapping and/or electrophysiology catheters, are used in a variety of diagnostic and/or therapeutic medical procedures. In some procedures, a catheter is manipulated through a patient's vasculature to a patient's heart, for example, and carries one or more electrodes that may be used for mapping, ablation, diagnosis, and/or to perform other functions. Typical catheters include a catheter shaft that connects to a catheter handle at a proximal end and carries the electrodes at a distal end. The catheter shaft is inserted into the patient's vasculature for delivering the electrodes to an intended site. Once at the intended site, treatment may include radio frequency (RF) ablation, cryoablation, lasers, chemicals, high-intensity focused ultrasound, electroporation, etc. As is readily apparent, such treatment requires precise control of the catheter during manipulation to, from, and at a mapping and/or treatment site, which can invariably be a function of a user's skill level. Typical catheters include an actuator assembly on the handle for manipulating the catheter shaft through the patient's vasculature and positioning the electrodes at the intended site. The actuator assembly can be used to displace a deflectable portion of the catheter shaft in at least one direction.

Some catheters include a loop assembly at the distal end of the catheter shaft. The loop assembly may be adjustable and/or positionable using the actuator assembly on the handle. For example, a loop actuation wire may extend through a lumen of the catheter shaft and be connected to the actuator assembly to allow a user to adjust the diameter of the loop assembly. However, operation of the actuation wire extending through the catheter shaft may cause unwanted displacement of the catheter shaft.

SUMMARY OF THE DISCLOSURE

In one aspect, a catheter shaft includes an elongate body extending from a proximal end to a distal end and including a proximal portion and a deflectable distal portion. The distal portion is selectively deflectable in at least one direction by actuation of a shaft actuator assembly. The elongate body defines at least one lumen extending from the proximal end to the distal end. The catheter shaft also includes a loop actuation wire extending through the at least one lumen and being operable to selectively adjust a diameter of an electrode loop assembly coupled at the distal end of the elongate body. The catheter shaft further includes a first coil wound around the loop actuation wire along the proximal portion of the elongate body and a second coil wound around the loop actuation wire along the distal portion of the elongate body. The second coil has a more flexible construction than the first coil.

In another aspect, a catheter includes a catheter shaft including an elongate body extending from a proximal end to a distal end and including a proximal portion and a deflectable, distal portion. The elongate body defines at least one lumen extending from the proximal end to the distal end. The catheter also includes an electrode loop assembly coupled at the distal end of the elongate body and a handle attached to the catheter shaft. The handle includes a loop actuator assembly and a shaft actuator assembly configured to selectively deflect the deflectable portion of the elongate body in at least one direction. The catheter shaft further includes a loop actuation wire connected to the loop actuator assembly and extending through the at least one lumen. The loop actuation wire is operable to selectively adjust a diameter of the electrode loop assembly by actuation of the loop actuator assembly. The catheter shaft also includes a first coil wound around the loop actuation wire along the proximal portion of the elongate body and a second coil wound around the loop actuation wire along the distal portion of the elongate body. The second coil has a more flexible construction than the first coil.

In yet another aspect, a method of assembling a catheter includes providing a catheter shaft comprising an elongate body extending from a proximal end to a distal end. The elongate body includes a proximal portion and a deflectable distal portion. The distal portion is selectively deflectable in at least one direction by actuation of a shaft actuator assembly. The elongate body defines at least one lumen extending from the proximal end to the distal end. The method also includes positioning a loop actuation wire within the at least one lumen. The loop actuation wire is operable to selectively adjust a diameter of an electrode loop assembly coupled at the distal end of the elongate body. The method further includes positioning a first coil around the loop actuation wire along the proximal portion of the elongate body and positioning a second coil around the loop actuation wire along the distal portion of the elongate body. The second coil has a more flexible construction than the first coil.

DETAILED DESCRIPTION OF THE DISCLOSURE

Figure 1:
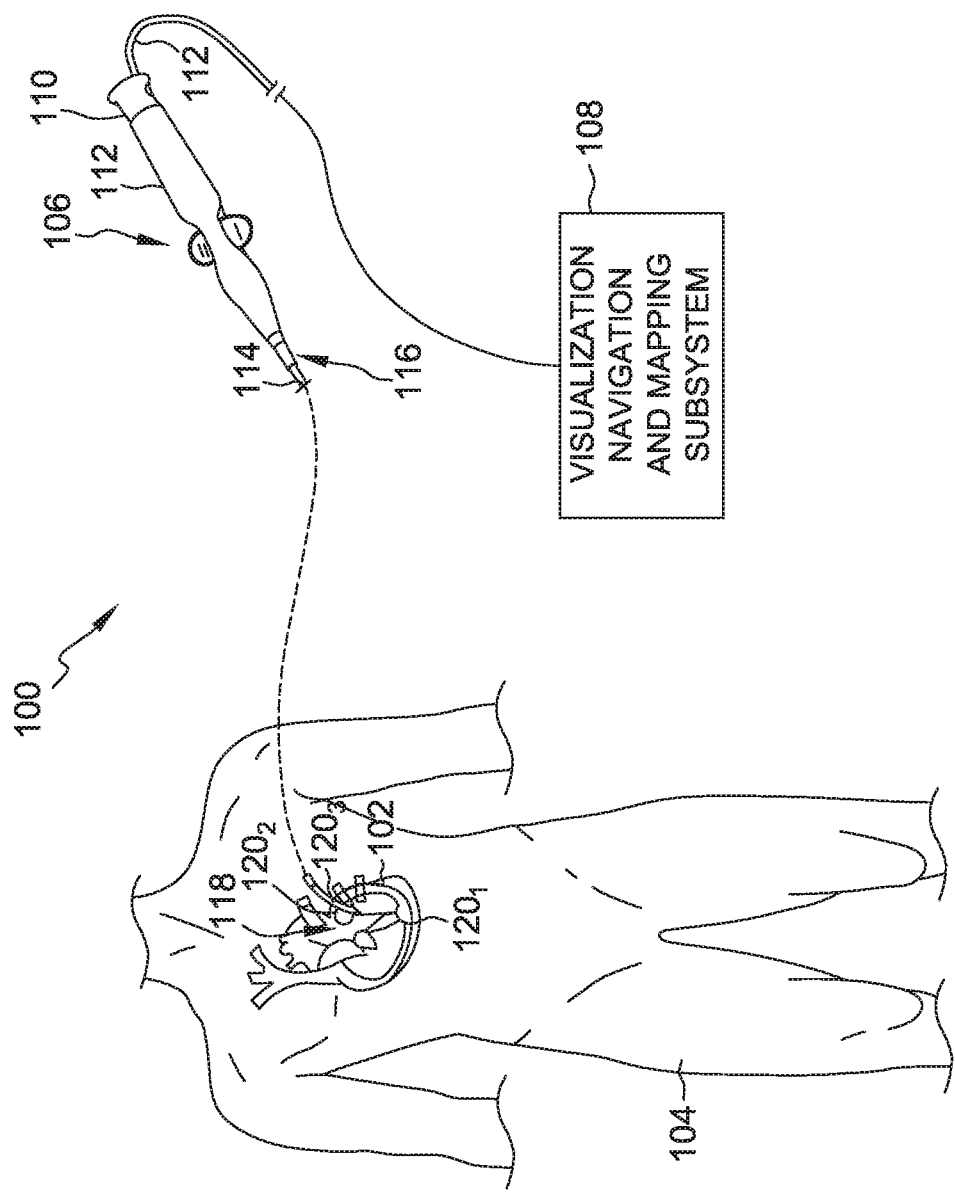
FIG. 1 is a schematic and block diagram view of a system for performing one or more diagnostic and/or therapeutic functions including a catheter.

The present disclosure is directed to a catheter including a deflectable shaft and coils positioned within the shaft to support the shaft. For example, the catheter may include a catheter shaft including an elongate body. The elongate body includes a proximal portion coupled to a catheter handle and a deflectable distal portion. A loop actuation wire extends through at least one lumen in the catheter shaft and is operable to selectively adjust a diameter of an electrode loop assembly coupled at the distal end of the elongate body. A first coil is wound around the loop actuation wire along the proximal portion. The construction of the first coil provides increased resistance to deformation of the catheter shaft (i.e., shaft nodding) when the distal loop assembly is adjusted using the actuation wire extending through the catheter shaft. For example, the rigidity of the first coil accommodates forces that occur during the adjustment of the distal loop assembly without the forces being translated into displacement or deformation of the catheter shaft.

A second coil is wound around the loop actuation wire along the distal portion. The second coil has a more flexible construction than the first coil. The flexibility of the second coil allows for the full range of motion of the deflectable portion. As a result, the second coil facilitates the distal portion having a uniform deflection profile when the distal portion is actuated using the actuator assembly. For example, because of the support provided by the second coil to the distal portion of the shaft, the distal portion has improved performance in bi-directional planarity and moves consistently in the desired plane without movement in a direction out of the desired plane.

Accordingly, the first coil and the second coil provide an efficient balancing of shaft performance parameters. For example, the first coil and the second coil reduce shaft nodding during adjustment of the distal loop assembly and provide desired bi-directional planarity of the deflectable distal portion. As a result, the catheter shafts of the present disclosure facilitate physicians' ability to accurately steer and predictably manipulate the catheter during operation.

In addition, in some embodiments, the first coil and the second coil are adjoined by a flexible coupler. The flexible coupler provides an operative connection between the first coil and the second coil and is resistant to stresses caused by the different flexible constructions of the coils. As a result, the flexible coupler increases performance reliability of the catheter by preventing detachment or displacement of the coils relative to each other during operation of the catheter. In addition, the flexible coupler may simplify assembly of the catheter because the flexible coupler allows the first and second coils to be positioned within the catheter shaft as a single assembly.

In some embodiments, the catheter as described herein is a unidirectional catheter. That is, the catheter shaft is deflectable in only a single direction. In other embodiments, the catheter is a bidirectional catheter. That is, the catheter shaft is deflectable in at least two different directions, for example, within the same or common plane.

Referring now to the drawings, FIG. 1 illustrates one exemplary embodiment of a system 100 for performing one or more diagnostic and/or therapeutic functions on or for a tissue 102 of a body 104. In an exemplary embodiment, tissue 102 includes heart or cardiac tissue within a human body 104. It should be understood, however, that system 100 may find application in connection with a variety of other tissues within human and non-human bodies, and therefore, the present disclosure is not meant to be limited to the use of system 100 in connection with only cardiac tissue and/or human bodies.

System 100 may include a medical device (e.g., a catheter 106) and a subsystem 108 for the visualization, navigation, and/or mapping of internal body structures (hereinafter referred to as the "visualization, navigation, and mapping subsystem 108", "subsystem 108", or "mapping system").

In this embodiment, the medical device includes a catheter 106, such as, for example, an electrophysiology catheter. In other exemplary embodiments, the medical device may take a form other than catheter 106, such as, for example and without limitation, a sheath or catheter-introducer, or a catheter other than an electrophysiology catheter. For clarity and illustrative purposes only, the description below will be limited to embodiments of system 100 wherein medical device is a catheter (catheter 106).

Catheter 106 is provided for examination, diagnosis, and/or treatment of internal body tissues such as tissue 102. Catheter 106 may include a wire connector 110 or interface, a handle 112, a shaft 114 having a proximal end 116 and a distal end 118 (as used herein, "proximal" refers to a direction toward the end of catheter 106 at handle 112 and away from body 104, and "distal" refers to a direction away from handle 112 and towards the end of catheter 106 introduced into body 104), and one or more sensors, such as, for example and without limitation, a plurality of electrodes 120 (i.e., 120₁, 120₂, . . . , 120_N), mounted in or on shaft 114 of catheter 106 at or near distal end 118 of shaft 114. Distal end 118 of catheter 106 may include an electrode loop assembly, such as electrode loop assembly 248 (shown in FIG. 2).

In other embodiments, catheter 106 may further include other conventional components such as, for example and without limitation, steering wires and actuators, irrigation lumens and ports, pressure sensors, contact sensors, temperature sensors, additional electrodes and corresponding conductors or leads, and/or ablation elements (e.g., ablation electrodes, high intensity focused ultrasound ablation elements, and the like).

Handle 112 provides a location for the operator to hold catheter 106 and may further provide means for steering or guiding shaft 114 within the patient. For example, handle 112 may include means to change the length of a guidewire extending through catheter 106 to distal end 118 of shaft 114 to steer shaft 114. It will be appreciated by those of skill in the art that the construction of handle 112 may vary.

Connector 110 provides mechanical and electrical connection(s) for the one or more wires 122 extending, for example, from visualization, navigation, and mapping subsystem 108 to one or more sensors mounted on catheter 106. In other embodiments, connector 110 may also provide mechanical, electrical, and/or fluid connections for wires extending from other components in system 100, such as, for example, an ablation system and a fluid source (when catheter 106 includes an irrigated catheter). Connector 110 is disposed at proximal end 116 of catheter 106.

In another exemplary embodiment, catheter 106 may be robotically driven or controlled. Accordingly, rather than an operator manipulating a handle to steer or guide catheter 106, and shaft 114 thereof, in particular, a robot is used to manipulate catheter 106.

Shaft 114 is generally an elongated, tubular, flexible member configured for movement within the patient. Shaft 114 supports, for example and without limitation, electrodes 120, associated conductors, and possibly additional electronics used for signal processing or conditioning. Shaft 114 may also permit transport, delivery and/or removal of fluids (including irrigation fluids, cryogenic ablation fluids, and bodily fluids), medicines, and/or surgical tools or instruments. Shaft 114 may be made from conventional materials such as polyurethane, and defines one or more lumens configured to house and/or transport at least electrical conductors, fluids, or surgical tools. Shaft 114 may be introduced into cardiac tissue 102 through a conventional introducer. Shaft 114 may then be steered or guided within cardiac tissue 102 to a desired location with guidewires or other means known in the art.

As described further herein, catheter 106 may include one or more support coils (not shown in FIG. 1) extending through shaft 114 to provide support to shaft 114 during operation of catheter 106. For example, a first coil may provide support near proximal end 116 of shaft 114 to prevent displacement or deformation of shaft 114 during adjustment of a distal electrode loop assembly. In addition, a second coil may provide support near distal end 118 of shaft 114 and allow a desired deflection of distal end 118 using an actuator assembly.

Visualization, navigation, and mapping subsystem 108 may be used to determine the positions of electrodes 120 or other sensors. These positions may be projected onto a geometrical anatomical model. In some embodiments, visualization, navigation, and mapping subsystem 108 includes a magnetic field-based system. For example visualization, navigation, and mapping subsystem 108 may include an electrical field- and magnetic field-based system such as the ENSITE PRECISION™ system commercially available from Abbott Laboratories, and generally shown with reference to U.S. Pat. No. 7,263,397 entitled "Method and Apparatus for Catheter Navigation and Location and Mapping in the Heart", the entire disclosure of which is incorporated herein by reference. In such embodiments, distal end 118 may include at least one magnetic field sensor—e.g., magnetic coils (not shown). If two or more magnetic field sensors are utilized, a full six-degree-of-freedom registration of magnetic and spatial coordinates could be accomplished without having to determine orthogonal coordinates by solving for a registration transformation from a variety of positions and orientations. Further benefits of such a configuration may include advanced dislodgement detection and deriving dynamic field scaling since they may be self-contained.

In other exemplary embodiments, subsystem 108 may utilize systems other than electric field-based systems. For example, subsystem 108 may include a magnetic field-based system such as the CARTO™ system commercially available from Biosense Webster, and as generally shown with reference to one or more of U.S. Pat. No. 6,498,944 entitled "Intrabody Measurement"; U.S. Pat. No. 6,788,967 entitled "Medical Diagnosis, Treatment and Imaging Systems"; and U.S. Pat. No. 6,690,963 entitled "System and Method for Determining the Location and Orientation of an Invasive Medical Instrument," the disclosures of which are incorporated herein by reference in their entireties.

In yet another exemplary embodiment, subsystem 108 may include a magnetic field-based system such as the GMPS system commercially available from MediGuide Ltd., and as generally shown with reference to one or more of U.S. Pat. No. 6,233,476 entitled "Medical Positioning System"; U.S. Pat. No. 7,197,354 entitled "System for Determining the Position and Orientation of a Catheter"; and U.S. Pat. No. 7,386,339 entitled "Medical Imaging and Navigation System," the disclosures of which are incorporated herein by reference in their entireties.

In a further exemplary embodiment, subsystem 108 may utilize a combination electric field-based and magnetic field-based system as generally shown with reference to U.S. Pat. No. 7,536,256 entitled "Hybrid Magnetic-Based and Impedance Based Position Sensing," the disclosure of which is incorporated herein by reference in its entirety. In yet still other exemplary embodiments, the subsystem 108 may comprise or be used in conjunction with other commonly available systems, such as, for example and without limitation, fluoroscopic, computed tomography (CT), and magnetic resonance imaging (MRI)-based systems.

Although not shown in FIG. 1, in some embodiments, system 100 may include suitable components to perform electroporation and/or ablation (e.g., RF ablation). It should be understood that in such embodiments, variations are possible as to the type of ablation energy provided (e.g., cryoablation, ultrasound, etc.).

Figure 2:
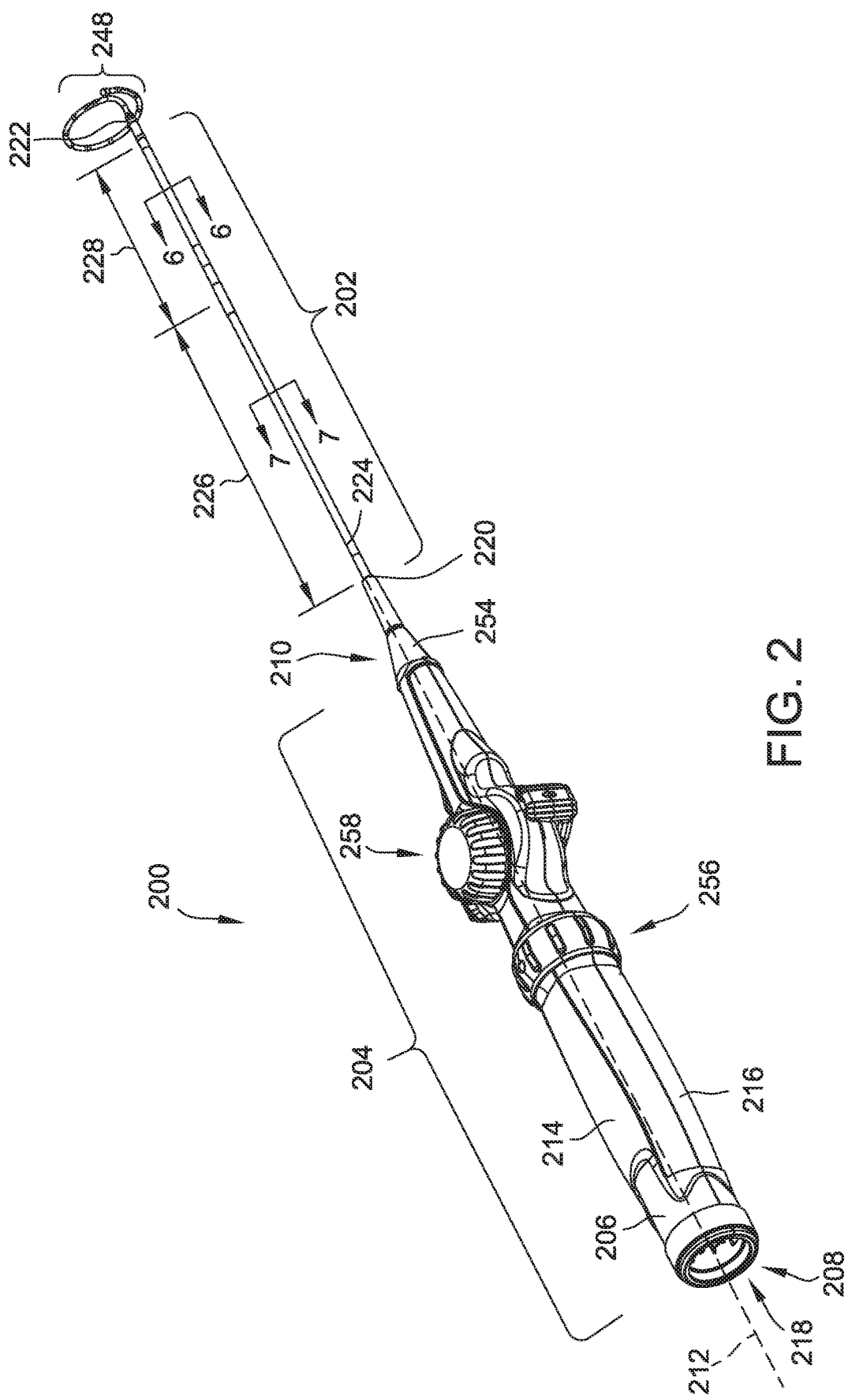
FIG. 2 is a perspective view of one embodiment of a catheter for use with the system of FIG. 1, the catheter including a catheter handle and a catheter shaft.

FIG. 2 illustrates one exemplary embodiment of a catheter 200 suitable for use with system 100 shown in FIG. 1. As used herein, the term catheter includes, without limitation, catheters, sheaths, and similar medical devices. As shown in FIG. 2, catheter 200 includes an elongated, flexible, generally cylindrical hollow shaft 202 and an ergonomically shaped actuation handle 204. In some embodiments, catheter 200 may include additional components such as, for example and without limitation, steering wires and actuators, irrigation lumens and ports, pressure sensors, contact sensors, temperature sensors, additional electrodes and corresponding conductors or leads, and/or ablation elements (e.g., ablation electrodes, high intensity focused ultrasound ablation elements, and the like).

As shown in FIG. 2, actuation handle 204 includes a housing 206 extending from a proximal end 208 to a distal end 210 along a longitudinal axis 212. Housing 206 includes an upper grip portion 214 and a lower grip portion 216. Upper grip portion 214 and lower grip portion 216 define an internal cavity 218 that extends longitudinally through actuation handle 204. In some embodiments, a fluid lumen (not shown) may be positioned in internal cavity 218 for irrigated configurations.

Figure 3:
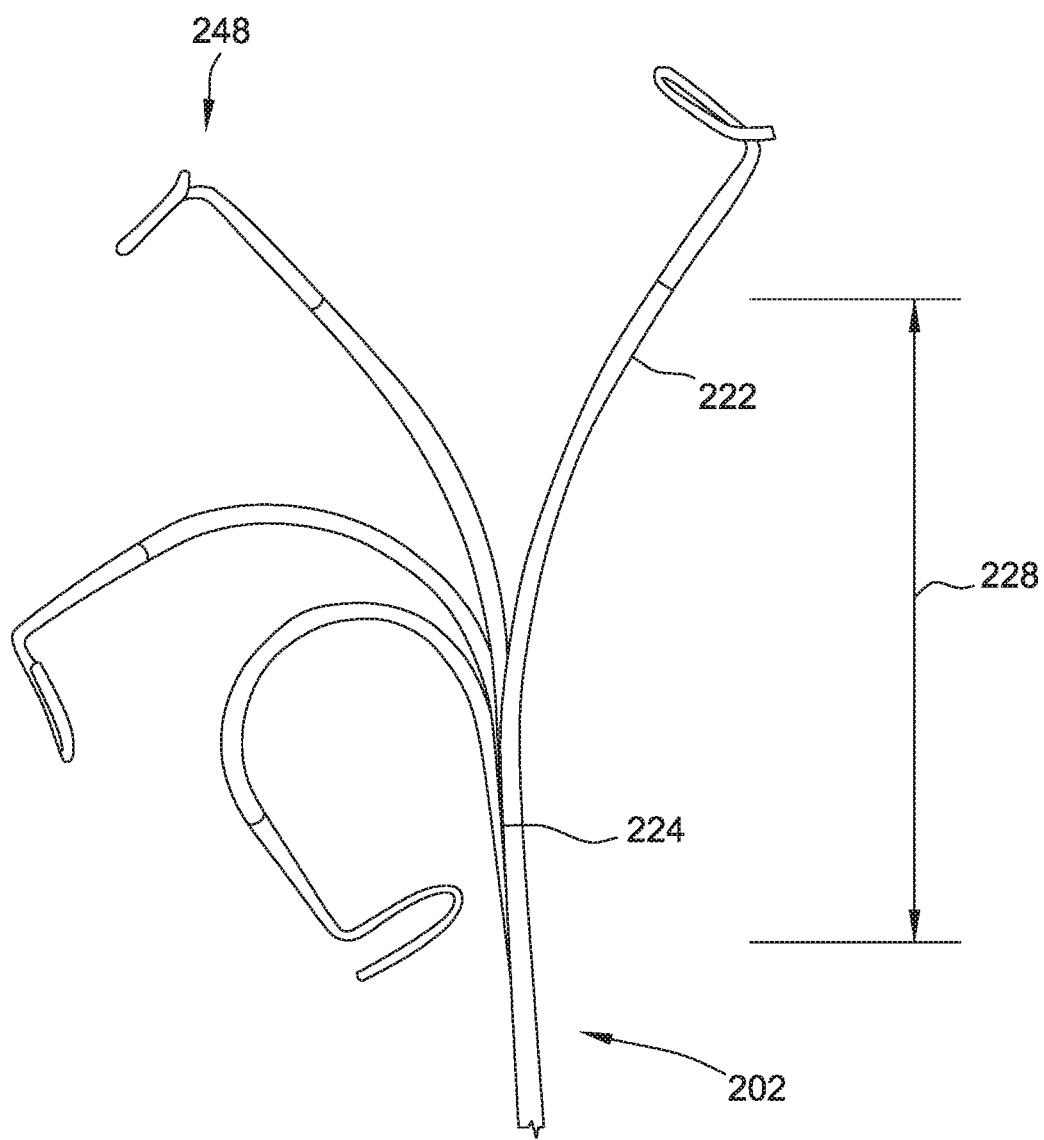
FIG. 3 is a perspective view of a deflectable distal portion of the catheter shaft shown in FIG. 2 illustrating the catheter shaft in different positions.

Shaft 202 has a proximal end 220 coupled to actuation handle 204 and a distal end 222. In some embodiments, distal end 222 of shaft 202 is deflectable, and actuation handle 204 is adapted to control deflection of deflectable distal end 222. For example, as shown in FIG. 3, distal end 222 of shaft 202 is deflectable in two, opposing directions (e.g., to the left or right as shown in FIG. 3) in the exemplary embodiment. The illustrated catheter 200 is a bidirectional catheter. In other embodiments, the catheter may be a unidirectional catheter (i.e., the tip is deflectable in only a single direction).

While a variety of materials can be used to construct shaft 202, it is typically constructed of polyurethane, nylon or any suitable electrically non-conductive material. The shaft 202 serves as at least a portion of the blood contacting segment of the catheter 200 and is vascularly inserted into a patient by methods and means well known in the art.

Shaft 202 includes an elongate body 224 extending from proximal end 220 to distal end 222 and includes a proximal portion 226 and a deflectable distal portion 228. In addition, elongate body 224 defines at least one lumen 230 (shown in FIGS. 6 and 7) extending from proximal end 220 to distal end 222. A loop actuation wire 232 (shown in FIGS. 6 and 7) extends through lumen 230 and is operable, for example, to selectively adjust a diameter of an electrode loop assembly 248 coupled at distal end 222 of shaft 202.

Figure 4:
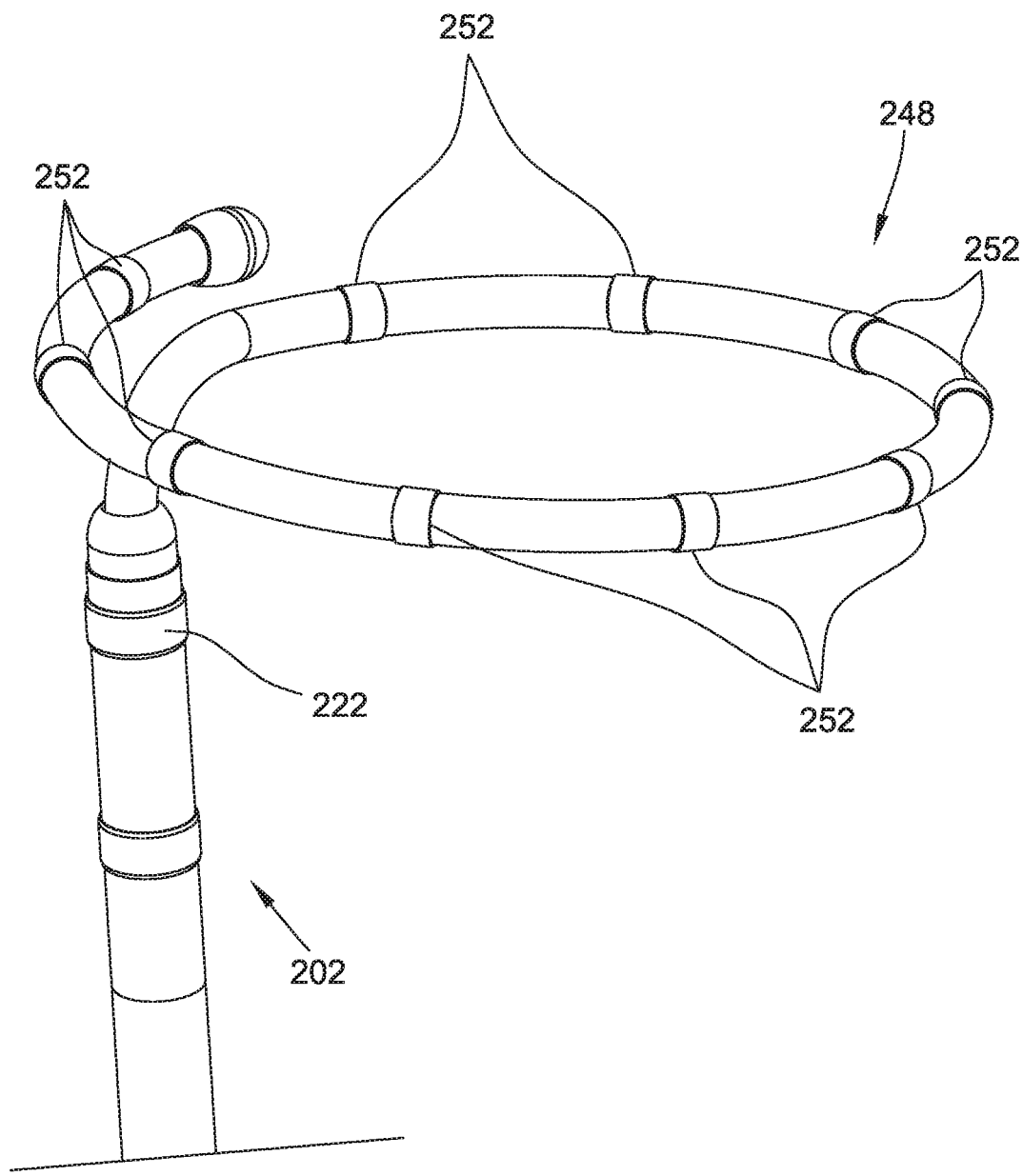
FIG. 4 is a perspective view of an electrode loop assembly of the catheter shown in FIG. 2.
Figure 5:
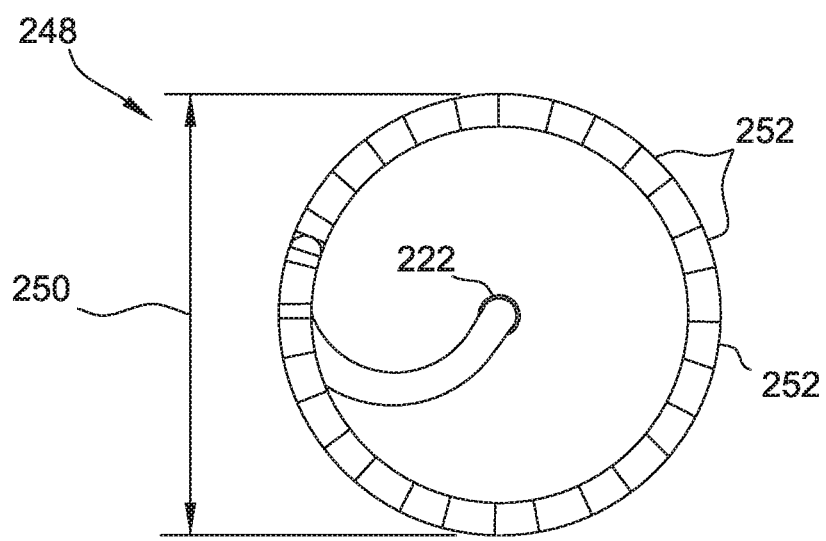
FIG. 5 is an end view of the electrode loop assembly shown in FIG. 4.

With additional reference to FIGS. 4 and 5, distal end 222 of shaft 202 includes electrode loop assembly 248. Electrode loop assembly 248 includes a plurality of catheter electrodes 252, which may be used for a variety of diagnostic and therapeutic purposes including, for example and without limitation, cardiac mapping and/or ablation. For example, one or more of catheter electrodes 252 may perform a location or position sensing function. More particularly, one or more of catheter electrodes 252 may be configured to be a positioning sensor(s) that provides information relating to the location (position and orientation) of electrode loop assembly 248.

A diameter of electrode loop assembly 248 may be variable in some embodiments. For example, electrode loop assembly 248 has a diameter 250 (shown in FIG. 5) transitionable between an expanded (also referred to as "open") diameter (shown in FIG. 5) and a retracted (also referred to as "closed") diameter (not shown). In the example embodiment, the expanded diameter is approximately 27 millimeters (mm) and the retracted diameter is approximately 15 mm. In other embodiments, diameter 250 may be variable between any suitable open and closed diameters. Alternatively, in other embodiments of the present disclosure, the diameter of electrode loop assembly 248 may be fixed.

Referring again to FIG. 2, in at least some embodiments where the diameter is variable, catheter 200 includes a first actuator 256 to allow an operator to adjust the diameter of electrode loop assembly 248; that is, an assembly or mechanism to increase or decrease the diameter of electrode loop assembly 248. Further, in at least some embodiments where shaft 202 includes deflectable distal portion 228, catheter 200 includes a second actuator 258 to allow an operator to selectively deflect distal portion 228 of shaft 202. For example, in one embodiment where distal end 222 forms a loop or lariat, actuation of first actuator 256 causes distal end 222 to increase or decrease the diameter of electrode loop assembly 248, and actuation of second actuator 258 causes distal end 222 to deflect in at least one direction. In other embodiments, first actuator 256 causes distal end 222 to deflect in at least one direction, and second actuator 258 causes distal end 222 to increase or decrease the diameter of electrode loop assembly 248. This diameter adjustment of electrode loop assembly 248 may be done at any time during a procedure, and may further be done with or without deflection of distal end 222 of catheter 200; that is, any deflection of distal end 222 is independent of any diameter adjustment of electrode loop assembly 248 in accordance with the present disclosure. This independent adjustment may be achieved through the use of multiple pull wires contained within catheter 200, for example, as described in U.S. Pat. App. Pub. No. 2017/0291008 entitled "Mapping Variable Loop Catheter Handle", the disclosure of which is incorporated herein by reference in its entirety. By having the capability to adjust the diameter of electrode loop assembly 248 before or during a procedure, an operator may be able to more effectively navigate the vasculature of a patient as described herein and improve patient outcomes.

Figure 6:
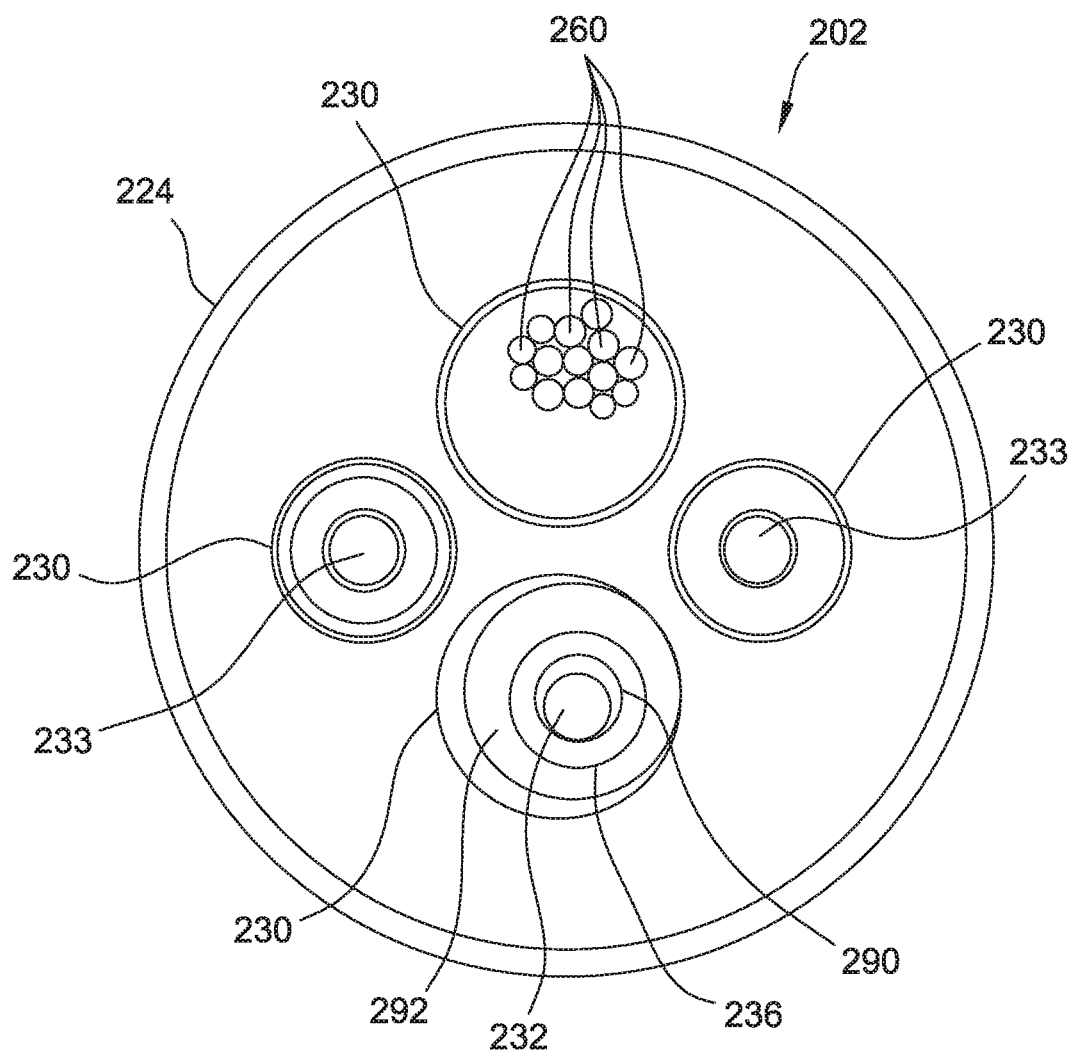
FIG. 6 is a cross-sectional view of the deflectable distal portion of the catheter shaft shown in FIG. 2, taken along line 6-6.
Figure 7:
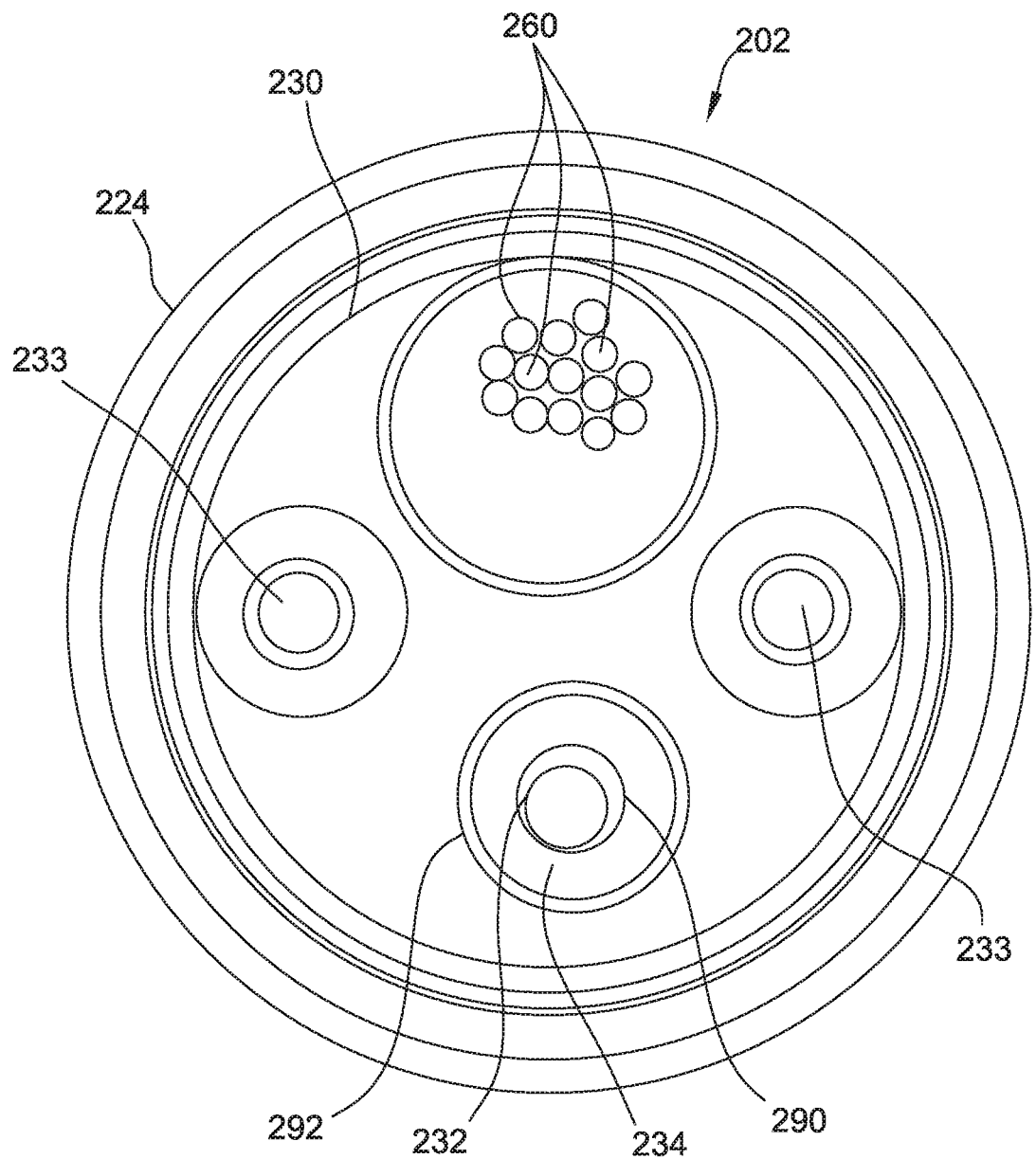
FIG. 7 is a cross-sectional view of a proximal portion of the catheter shaft shown in FIG. 2, taken along line 7-7.

With additional reference to FIGS. 6 and 7, first actuator 256 and second actuator 258 may be connected to deflectable distal end 222 of shaft 202 by actuation wires 232, 233. For example, loop actuation wire 232 may be coupled to first actuator 256, and shaft actuation wires 233 may be coupled to second actuator 258. Actuation wires 232, 233 can be any of the actuation wire types known in the art including, for example and without limitation, pull or tension wires (i.e., actuation wires not adapted to support a compressive load), and pull/push or tension/compression wires (is., actuation wires adapted to support a compressive load). In embodiments including pull/push actuation wires, when one actuation wire is placed in tension, the other actuation wire will carry a compressive load. The actuation wires can be formed from a super elastic Nitinol wire or another suitable material.

As shown in FIGS. 6 and 7, shaft 202 includes a plurality of lumens 230 defined by elongate body 224 and extending from proximal end 220 to distal end 222. In the illustrated embodiment, distal portion 228 of shaft 202 includes four lumens 230 as shown in FIG. 6. Proximal portion 226 of shaft 202 includes a single lumen 230 as shown in FIG. 7. Electrical conductor wires 260 and actuation wires 232, 233 extend through lumens 230. Specifically, electrical conductor wires 260 extend from actuation handle 204 through lumens 230 to electrodes 252 and magnetic sensors of electrode loop assembly 248. Shaft actuation wires 233 extend from second actuator 258 through separate lumens 230, and are operable to deflect distal end 222 of shaft 202 upon actuation of second actuator 258. In addition, at least one actuation wire 232 extends from first actuator 256 through lumens 230 and is operable to adjust diameter 250 of electrode loop assembly 248 upon actuation of first actuator 256.

Referring again to FIG. 2, a wire connector, such as wire connector 110 shown in FIG. 1, may be at proximal end 208 of actuation handle 204. Actuation handle 204 can also include a strain relief 254 at distal end 210. In embodiments including electrodes, such as electrodes 252 on electrode loop assembly 248 shown in FIG. 4, each electrode 252 may be connected to an electrical conductor wire 260 (shown in FIGS. 6 and 7) that extends to the wire connector through shaft 202, strain relief 254, and actuation handle 204. The wire connector is adapted to be connected to a device, such as a recording, monitoring, or RF ablation device.

Figure 8:
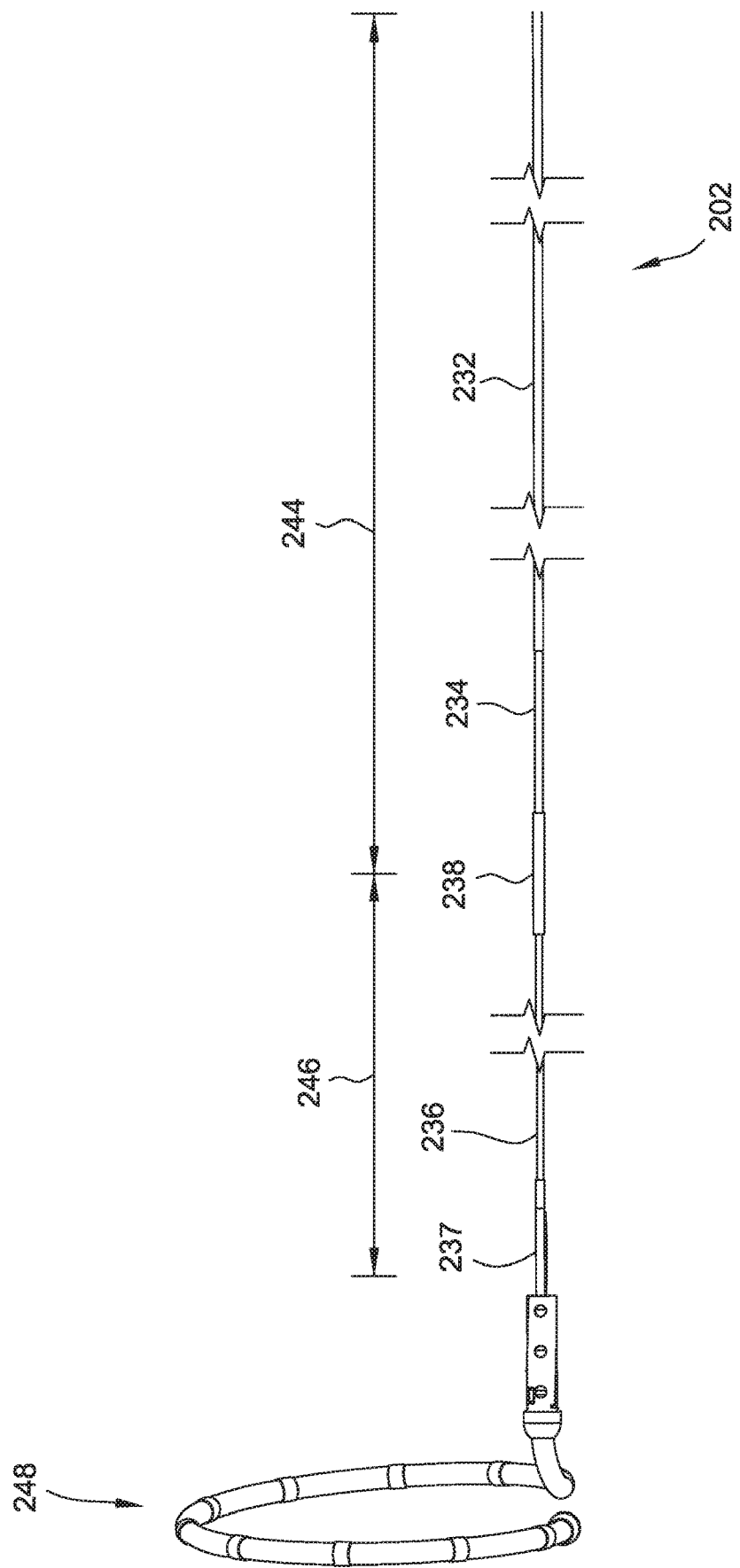
FIG. 8 is a top view of a portion of the catheter shaft shown in FIG. 2 with a body of the catheter shaft removed to illustrate an actuation wire and coils positioned around the actuation wire.
Figure 9:
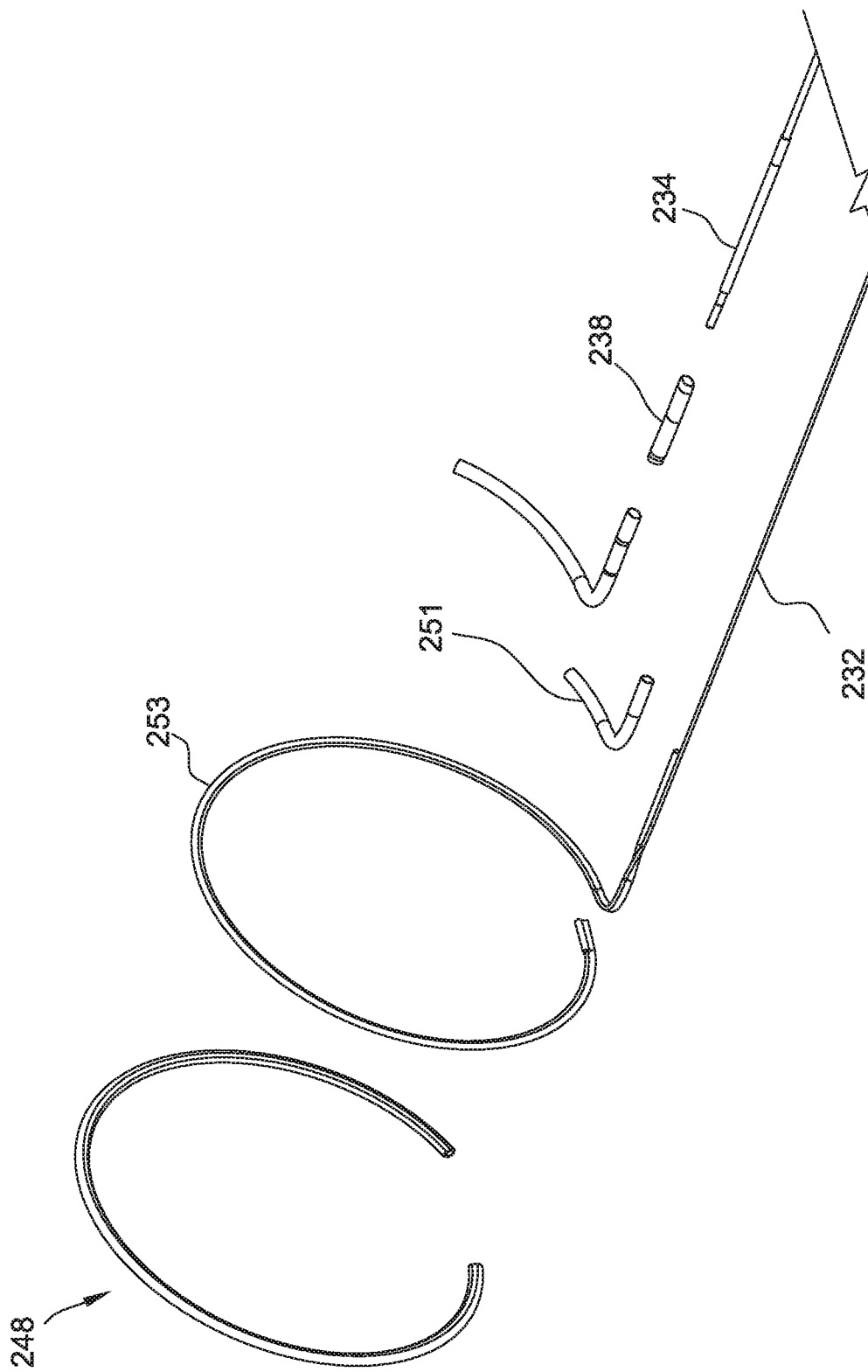
FIG. 9 is a partially exploded view of a portion of the catheter shaft shown in FIGS. 2 and 8.
Figure 10:
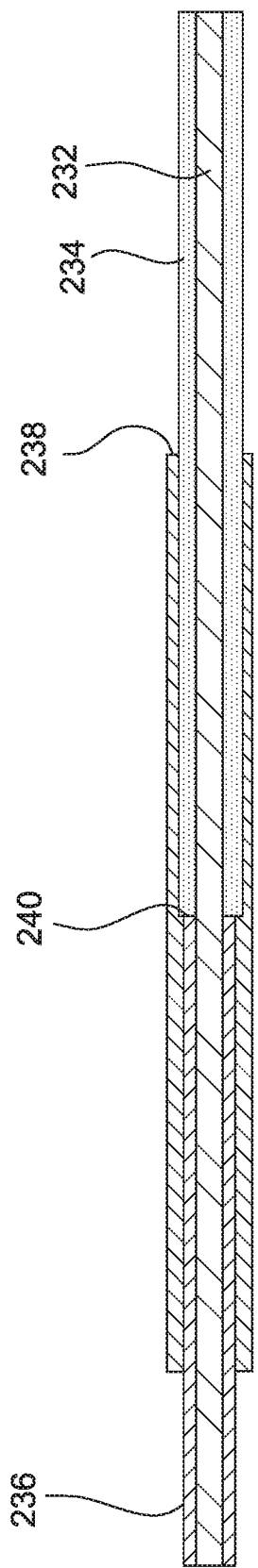
FIG. 10 is a sectional view of a portion of a coil assembly and an actuation wire of the catheter shaft shown in FIGS. 2 and 8.

With additional reference to FIGS. 8-10, shaft 202 further includes a first coil 234 and a second coil 236. First coil 234 is wound around loop actuation wire 232 along proximal portion 226 of elongate body 224, and second coil 236 is wound around loop actuation wire 232 along distal portion 228 of elongate body 224. First coil 234 and second coil 236 are configured to provide targeted support to portions 226, 228 of elongate body 224 to inhibit or prevent undesired movement of shaft 202, and to facilitate movement of shaft 202 along desired paths of motion. More specifically, first coil 234 and second coil 236 are constructed and positioned within shaft 202 to provide a balance between controlled deflection of distal portion 228 and resistance to deformation or deflection of shaft 202. For example, second coil 236 provides support to distal portion 228 of elongate body 224, and has a more flexible construction than first coil 234 to allow selective deflection of distal portion 228. First coil 234 provides support to proximal portion 226 of elongate body 224, and has a stiffer or more rigid construction than second coil 236 to inhibit or prevent shaft nodding when loop actuation wire 232 is actuated.

The varying flexibilities of first coil 234 and second coil 236 may be imparted to the coils using any suitable processes and techniques that enables shaft 202 to function as described herein. In some embodiments, for example, first coil 234 and second coil 236 are constructed of separate, helically-wound wires having different stiffness properties. More specifically, first coil 234 may be constructed from a first wire and second coil 236 may be constructed from a second wire that has at least one characteristic different from a characteristic of the first wire. The at least one characteristic can include, for example and without limitation, a cross-sectional area of the wires, an intrinsic (i.e., material-dependent) stiffness of the wires, a tensile strength of the wires, and combinations thereof. For example, the first wire may have a cross-sectional area that is greater than a cross-sectional area of the second wire such that the first wire has a greater stiffness than the second wire. Additionally or alternatively, the first wire may have an intrinsic stiffness that is greater than an intrinsic stiffness of the second wire. Further, the first wire may have a tensile strength that is greater than a tensile strength of the second wire.

The varying flexibilities of first coil 234 and second coil 236 may also be imparted to the coils using suitable manufacturing processes. In some embodiments, for example, first coil 234 and second coil 236 are constructed to have different flexibilities by varying the initial tension of the coils. The term "initial tension" refers to an initial or intrinsic stiffness imparted to a coil as a result of the coil winding process. For example, a desired initial tension may be imparted to a coil by controlling the speed and/or the force applied to the coil as the coil is wound. A "tightly" wound coil will have a greater initial tension than a "loosely" wound coil. In some embodiments, first coil 234 is wound to have an initial tension greater than an initial tension of second coil 236.

First coil 234 and second coil 236 may be constructed from any suitable coils that enables shaft 202 to function as described herein. In some embodiments, for example, first coil 234 and/or second coil 236 are constructed of wires including, without limitation, metallic wires (e.g., stainless steel, nickel titanium alloy, and/or other metals) and polymer-based materials including thermoset materials and thermoplastic elastomers (e.g., polyethylene, polyurethane, and acrylonitrile butadiene styrene). The wires may have any suitable cross-sectional shape that enables first and second coils 234 and 236 to function as described herein, including, for example and without limitation, circular wires, square wires, and rectangular wires. In some embodiments, first coil 234 is constructed from a first wire that has at least one dimension that is greater than a dimension of a second wire used to construct second coil 236. In one particular embodiment, for example, the first wire has a thickness of approximately 0.005 inches (in.) and a width of approximately 0.008 in, and the second wire has a thickness of approximately 0.003 in. and a width of approximately 0.007 in.

As noted above, first coil 234 is constructed to resist deformation or displacement of proximal portion 226 of shaft 202 when a force is applied to a component extending through shaft 202, such as actuation wire 232. To maintain or enhance performance of first coil 234, the spacing between adjacent coils of first coil 234 may be controlled or minimized to reduce movement of adjacent coils of first coil 234 relative to each other. For example, in some embodiments, first coil 234 is wound such that a cumulative spacing between adjacent coils or wraps of first coil 234 is less than about 0.020 in. or less than about 0.002 in.

In the illustrated embodiment, first coil 234 has a length 244 that is greater than a length 246 of second coil 236. In some embodiments, length 244 of first coil 234 is at least about 20 in. or at least about 40 in., and length 246 of second coil 236 is in a range of about 2.5 in. to about 5.0 in. Because first coil 234 is longer than second coil 236 and extends along a majority, i.e., greater than 50%, of shaft 202, first coil 234 and its associated greater stiffness plays a larger role in preventing shaft nodding throughout substantially the entire shaft 202 as compared to second coil 236.

In some embodiments, a third coil 251 is positioned at an elbow or connection between loop actuation wire 232 and a shape wire 253 (shown in FIG. 9) of electrode loop assembly 248 to provide additional support to loop actuation wire 232 and electrode loop assembly 248. Third coil 251 may be constructed to be smaller and more flexible than first coil 234 and second coil 236 to allow third coil 251 to bend and extend through the elbow.

In some embodiments, a support 237 is provided on at least a portion of second coil 236 along at least a length of proximal portion 226. For example, support 237 extends along a distal portion of second coil 236 in the illustrated embodiment. Support 237 is configured to provide additional support to second coil 236 and elongate body 224 at the connection to electrode loop assembly 248. In some embodiments, support 237 includes a thermoplastic elastomer material.

Shaft 202 also includes a flexible coupler 238 that connects first coil 234 and second coil 236 at a connection point 240 and encloses connection point 240. Flexible coupler 238 is flexible and accommodates different flexibilities of first coil 234 and second coil 236. In addition, flexible coupler 238 includes a material that attaches to both first coil 234 and second coil 236 and maintains the connection between first coil 234 and second coil 236 during flexing of first coil 234 and/or second coil 236. In some embodiments, flexible coupler 238 includes a thermoplastic resin.

In other embodiments, first coil 234 and second coil 236 may be connected in any manner that enables shaft 202 to function as described herein. For example and without limitation, in some embodiments, first coil 234 and second coil 236 are adjoined by adhesives, welds, solder joints, mechanical fasteners, and/or a combination thereof. In the illustrated embodiment, an end of first coil 234 is adjoined to an end of second coil 236 such that first coil 234 and second coil 236 do not overlap. In alternative embodiments, the connected portions of first coil 234 and second coil 236 partially overlap each other. In further embodiments, first coil 234 and second coil 236 are constructed from a single piece of wire as a single continuous coil having different properties along its length. For example, in some embodiments, first coil 234 includes a first segment of a continuous coil that is wound with a first initial tension and second coil 236 includes a second segment of the continuous coil that is wound with a second initial tension.

Referring again to FIGS. 6 and 7, first coil 234 and second coil 236 are positioned within lumen 230 and around actuation wire 232. In the illustrated embodiment, actuation wire 232 and lumen 230 are radially offset relative to the longitudinal axis of shaft 202. Accordingly, when actuation wire 232 is operated, shaft 202 may be subjected to off-center axial forces that, in the absence of first coil 234 and second coil 236, could cause shaft nodding. First coil 234 is configured to counter-act the off-center forces and prevent shaft nodding when actuation wire 232 is operated, for example, because first coil 234 has a relatively rigid construction and extends along actuation wire 232 through proximal portion 226 of shaft 202.

First coil 234 and second coil 236 each define a central cavity 290 that is configured to receive actuation wire 232. For example, each central cavity 290 has a diameter that is larger than the diameter of actuation wire 232. Central cavities 290 are suitably sized to provide space for actuation wire 232 to be spaced from coils of first coil 234 and second coil 236 and prevent first coil 234 and second coil 236 from interfering with operation of actuation wire 232.

In some embodiments, a casing or sleeve is positioned on actuation wire 232, first coil 234, and/or second coil 236. For example, in the illustrated embodiment, a casing 292 extends around first coil 234 and second coil 236 to prevent interference between first coil 234 and second coil 236 and other components within shaft 202. Casing 292 may include an elastomer polymer material. Casing 292 is configured to maintain an orientation of first coil 234 and second coil 236 within lumen 230. Moreover, casing 292 accommodates the different diameters of first coil 234 and second coil 236. For example, casing 292 has a greater thickness along second coil 236 than along first coil 234 because first coil 234 is wider than second coil 236 in the illustrated embodiment.

Figure 11:
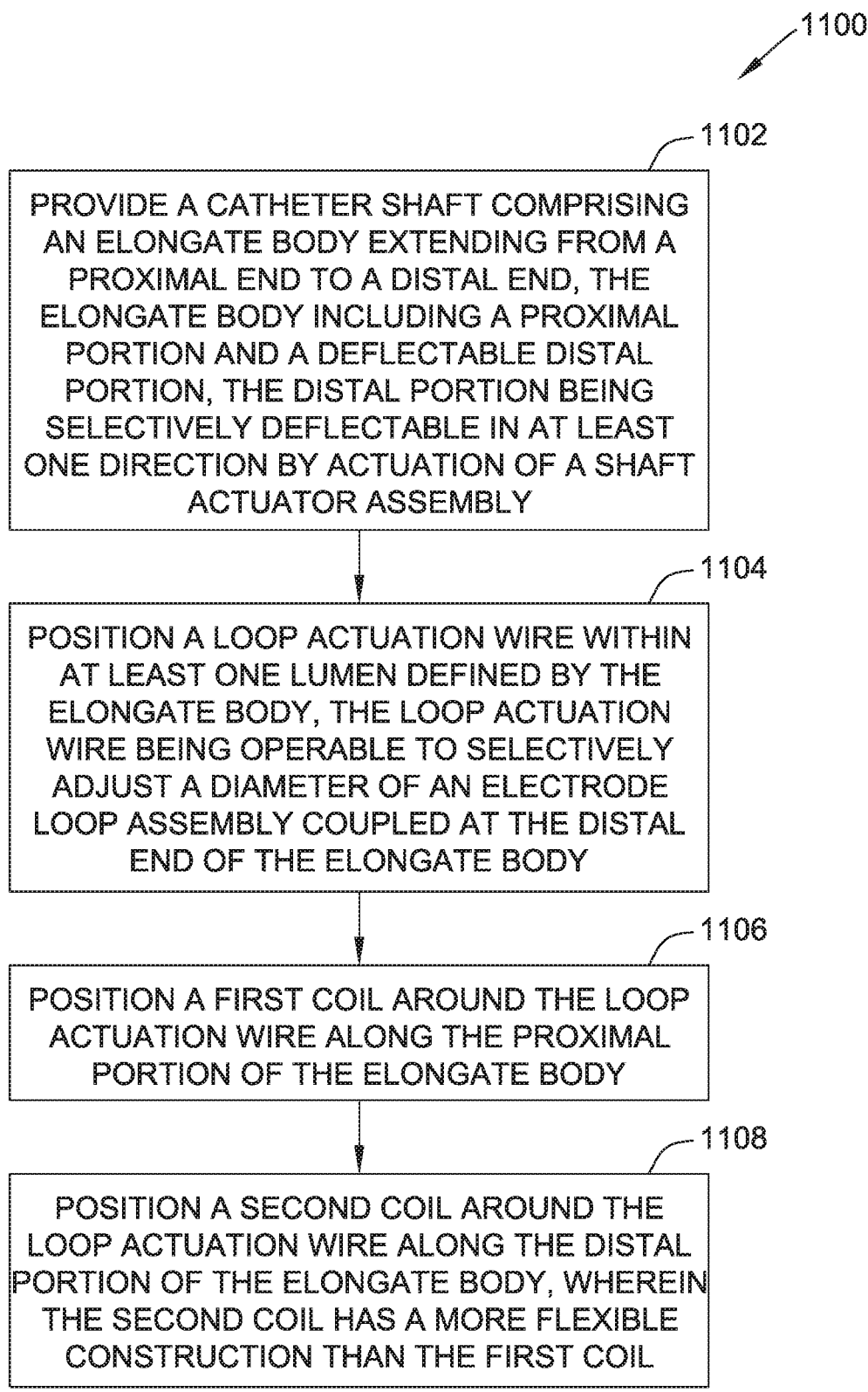
FIG. 11 is a flow diagram illustrating one embodiment of a method of assembling a catheter.

FIG. 11 is a flow diagram illustrating one embodiment of a method 1100 of assembling a catheter (e.g., catheter 200 shown in FIG. 2). Method 1100 includes providing 1102 a catheter shaft (e.g., shaft 202) comprising an elongate body (e.g., elongate body 224) extending from a proximal end to a distal end. The elongate body includes a proximal portion (e.g., proximal portion 226) and a deflectable distal portion (e.g., distal portion 228). The distal portion is selectively deflectable in at least one direction by actuation of a shaft actuator assembly (e.g., first actuator 256 and second actuator 258). The elongate body defines at least one lumen extending from the proximal end to the distal end.

Method 1100 also includes positioning 1104 a loop actuation wire (e.g., loop actuation wire 232) within the at least one lumen. The loop actuation wire is operable to selectively adjust a diameter of an electrode loop assembly (e.g., electrode loop assembly 248) coupled at the distal end of the elongate body.

Method 1100 further includes positioning 1106 a first coil (e.g., first coil 234) around the loop actuation wire along the proximal portion of the elongate body and positioning 1108 a second coil (e.g., second coil 236) around the loop actuation wire along the distal portion of the elongate body. The second coil has a more flexible construction than the first coil. Accordingly, the first coil provides support to the shaft and resists deformation of the shaft during operation of the loop actuation wire. In addition, the second coil allows for selective displacement of the distal portion.

In some embodiments, method 1100 includes connecting the first coil and the second coil at a connection point and enclosing the connection point with a flexible coupler (e.g., flexible coupler 238). In further embodiments, method 1100 includes attaching a catheter handle (e.g., catheter handle 204) to a proximal end (e.g., proximal end 220) of the catheter shaft and coupling the electrode loop assembly to a distal end (e.g., distal end 222) of the elongate body.

Although certain steps of the example method are numbered, such numbering does not indicate that the steps must be performed in the order listed. Thus, particular steps need not be performed in the exact order they are presented, unless the description thereof specifically require such order. The steps may be performed in the order listed, or in another suitable order.

Although the embodiments and examples disclosed herein have been described with reference to particular embodiments, it is to be understood that these embodiments and examples are merely illustrative of the principles and applications of the present disclosure. It is therefore to be understood that numerous modifications can be made to the illustrative embodiments and examples and that other arrangements can be devised without departing from the spirit and scope of the present disclosure as defined by the claims. Thus, it is intended that the present application cover the modifications and variations of these embodiments and their equivalents.

This written description uses examples to disclose the invention, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A catheter shaft comprising:
an elongate body extending from a proximal end to a distal end and including a proximal portion and a deflectable distal portion, wherein the distal portion is selectively deflectable in at least one direction by actuation of a shaft actuator wire of a shaft actuator assembly, the elongate body defining at least one lumen extending from the proximal end to the distal end;
a loop actuation wire extending through the at least one lumen and being operable to selectively adjust a diameter of an electrode loop assembly coupled at the distal end of the elongate body, the electrode loop assembly being shaped as a loop prior to actuation of the loop actuation wire;
a first coil wound around the loop actuation wire along the proximal portion of the elongate body; and
a second coil wound around the loop actuation wire along the distal portion of the elongate body, wherein the second coil has a more flexible construction than the first coil.

2. The catheter shaft of claim 1, wherein the first coil adjoins the second coil at a connection point, wherein the catheter shaft further comprises a flexible coupler connecting the first coil to the second coil at the connection point and enclosing the connection point.

3. The catheter shaft of claim 2, wherein the flexible coupler comprises a thermoplastic resin.

4. The catheter shaft of claim 1, wherein a length of the distal portion is less than a length of the proximal portion.

5. The catheter shaft of claim 1, wherein the first coil has an initial tension greater than an initial tension of the second coil.

6. The catheter shaft of claim 1, wherein the first coil and the second coil are constructed from a single, continuous wire.

7. The catheter shaft of claim 1, wherein the first coil is constructed from a first wire and the second coil is constructed from a second wire.

8. The catheter shaft of claim 7, wherein a cross-sectional area of the first wire is greater than a cross-sectional area of the second wire.

9. The catheter shaft of claim 7, wherein the first wire is stiffer than the second wire.

10. The catheter shaft of claim 7, wherein the first wire has a greater tensile strength than the second wire.

11. The catheter shaft of claim 1, wherein the first coil has a cumulative spacing between adjacent coils that is less than about 0.002 in.

12. The catheter shaft of claim 1, wherein the distal portion is selectively deflectable in a first direction and a second, opposite direction by actuation of the shaft actuator assembly.

13. A catheter comprising:
a catheter shaft comprising an elongate body extending from a proximal end to a distal end and including a proximal portion and a deflectable, distal portion, wherein the distal portion is selectively deflectable in at least one direction by actuation of a shaft actuator wire of a shaft actuator assembly, the elongate body defining at least one lumen extending from the proximal end to the distal end;
an electrode loop assembly coupled at the distal end of the elongate body; and
a handle attached to the catheter shaft and including a loop actuator assembly and a shaft actuator assembly configured to selectively deflect the deflectable portion of the elongate body in at least one direction;
wherein the catheter shaft further comprises:
a loop actuation wire connected to the loop actuator assembly and extending through the at least one lumen, the loop actuation wire being operable to selectively adjust a diameter of the electrode loop assembly by actuation of the loop actuator assembly, the electrode loop assembly being shaped as a loop prior to actuation of the loop actuation wire;
a first coil wound around the loop actuation wire along the proximal portion of the elongate body; and
a second coil wound around the loop actuation wire along the distal portion of the elongate body, wherein the second coil has a more flexible construction than the first coil.

14. The catheter of claim 13, wherein the first coil adjoins the second coil at a connection point, wherein the catheter shaft further comprises a flexible coupler connecting the first coil to the second coil at the connection point and enclosing the connection point.

15. The catheter of claim 13, wherein a length of the distal portion is less than a length of the proximal portion.

16. The catheter of claim 13, wherein the distal portion is selectively deflectable in a first direction and a second, opposite direction by actuation of the shaft actuator assembly.

17. The catheter of claim 13, wherein the first coil and the second coil are constructed from a single, continuous wire.

18. The catheter of claim 13, wherein the first coil is constructed from a first wire and the second coil is constructed from a second wire.

19. A method of assembling a catheter comprising:
providing a catheter shaft comprising an elongate body extending from a proximal end to a distal end, the elongate body including a proximal portion and a deflectable distal portion, the distal portion being selectively deflectable in at least one direction by actuation of a shaft actuation wire of a shaft actuator assembly, the elongate body defining at least one lumen extending from the proximal end to the distal end;
positioning a loop actuation wire within the at least one lumen, the loop actuation wire being operable to selectively adjust a diameter of an electrode loop assembly coupled at the distal end of the elongate body, the electrode loop assembly being shaped as a loop prior to actuation of the loop actuation wire;
positioning a first coil around the loop actuation wire along the proximal portion of the elongate body; and
positioning a second coil around the loop actuation wire along the distal portion of the elongate body, wherein the second coil has a more flexible construction than the first coil.

20. The method of claim 19 further comprising connecting the first coil and the second coil at a connection point, wherein the catheter shaft further comprises a flexible coupler connecting the first coil to the second coil at the connection point and enclosing the connection point.

* * * * *